Patented June 6, 1939

2,161,552

UNITED STATES PATENT OFFICE 2,161,552

ESTERS OF PHTHALIC ACID

Byron M. Vanderbilt, Terre Haute, Ind., assignor to Commercial Solvents Corporation, Terre Haute, Ind., a corporation of Maryland No Drawing. Application May 5, 1938, Serial No. 206,190

7 Claims. (Cl. 260—475)

My invention relates to new and useful esters of phthalic acid. More particularly, it relates to the acid and mixed phthalates of aliphatic nitroalcohols having the following general structural formula:

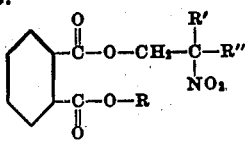

in which R, R', and R'' may be hydrogen or alkyl radicals.

The acid esters of the aliphatic nitroalcohols may be prepared by methods similar in many respects to those used for preparing the corresponding compounds of the aliphatic alcohols. However, since the aliphatic nitroalcohols differ somewhat in their physical and chemical properties from the aliphatic alcohols, certain modifications of the usual procedures should preferably be employed. In general, the acid phthalates of the aliphatic nitroalcohols may be prepared by reacting phthalic anhydride with a molecular excess of nitroalcohol and allowing the reaction mixture to stand for 24–72 hours at a temperature of from 60° C. to not substantially in excess of 100° C., and preferably within the range 75–90° C. The acid phthalates thereby produced may be purified by various methods, but I prefer the method which consists of the selective extraction of the unreacted aliphatic nitroalcohol from the crude reaction mixture by the use of a liquid which is a good solvent for the unreacted nitroalcohol but in which the acid phthalate is substantially insoluble. The acid phthalates thus obtained are ordinarily sufficiently pure for most technical uses and if they are to be used for further esterification with, for example, the aliphatic nitroalcohol used in producing the acid ester, the excess unreacted aliphatic nitroalcohol may or may not be separated from the acid phthalate. However, if desired, they may be further purified by recrystallization from benzol or a solution of benzol and absolute alcohol.

The mixed phthalates of the aliphatic nitroalcohols may be suitably prepared by reacting an acid phthalate of an aliphatic nitroalcohol with the desired aliphatic alcohol in the presence of an acid catalyst such as sulfuric acid. During the esterification of an acid phthalate of a nitroalcohol with a low molecular weight aliphatic alcohol, certain side reactions occur, as for example, alcoholysis, with the result that there is formed a mixture of mixed phthalate, dialkyl phthalate, unreacted aliphatic alcohol, and the nitroalcohol resulting from the alcoholysis. However, no great difficulty is experienced in the separation of the resulting esters since the boiling points of the dialkyl phthalates formed are usually 40–60° below the boiling points of the mixed phthalates of the nitroalcohols and the lower aliphatic alcohol used. While the mixed phthalates of the aliphatic nitroalcohols obtained by this operation may be purified in a number of ways, I prefer to first remove the unreacted aliphatic alcohol from the crude reaction product by distillation at atmospheric pressure, followed by vacuum distillation, it being desirable not to heat mixtures containing nitroalcohols in the presence of mineral acids substantially above 125–130° C. The substantially aliphatic alcohol-free reaction mixture is then diluted with benzol and the acid catalyst removed by washing with water. The resulting mixture is then subjected to vacuum distillation, and the mixed esters obtained therefrom. If further purification is desired, the mixed phthalate may be redistilled under vacuum. It is understood, of course, that the mixed phthalate esters may be suitably purified by other methods than vacuum distillation, e. g., by extraction and treatment with decolorizing carbons.

The production of the acid and mixed phthalates of the aliphatic nitroalcohols may be further illustrated by the following examples:

Example I

In a 250 cc. Erlenmeyer flask there was placed 0.2 mole of 2-methyl-2-nitro-1-butanol (26.6 g.) and 0.1 mole of technical phthalic anhydride (22.2 g.). The resulting mixture was then maintained at a temperature of approximately 85° C. for 4 days. At the end of this time, the contents of the flask consisted of a pale yellow liquid which solidified on cooling to room temperature. It was treated with 70 cc. of a solution containing equal parts of benzol and petroleum ether, filtered, washed with petroleum ether, and dried at 85° C. There was obtained 37.3 g. of a white solid which was found upon analysis to contain 95% 2-methyl-2-nitrobutyl hydrogen phthalate and 5% phthalic anhydride.

The production of mixed phthalates of aliphatic nitroalcohols is illustrated by the following example:

Example II

A solution of 98 g. of the acid phthalate of 2-methyl-2-nitro-1-butanol in 200 cc. of methanol containing 0.9 g. of sulfuric acid was placed in a 500 cc. Claisen flask and slowly heated in an oil bath at a tempreature of 120° C. After the distillation of the methanol and any water formed in the reaction had practically ceased, additional methanol was slowly added below the surface of the liquid in the flask until a total of 250 cc. of methanol had been added over a period of 5 hours. Air was then passed through the solution for a few minutes in order to remove the last traces of methanol. After cooling, the reaction mixture was diluted with an equal volume of benzol and washed with water to remove the sulfuric acid catalyst. The benzol was then removed from the reaction mixture by distillation at atmospheric pressure. Subsequent distillation at a pressure of approximately 2 mm. yielded 69 g. of methyl 2-methyl-2-nitrobutyl phthalate as well as a small amount of 2-methyl-2-nitro-1-butanol and dimethyl phthalate.

Example III

A solution of 135 g. of the acid phthalate of 2-methyl-2-nitro-1-propanol and 0.9 g. of sulfuric acid in 100 cc. of butanol was placed in a reaction vessel and heated to 120–125° C. A slight vacuum was then applied to the system and the greater portion of the butanol slowly removed by distillation. Additional butanol was then added and the heating continued, followed by subsequent distillation until 900 cc. of butanol had been added over a period of 9 hours. The resulting product was dissolved in benzol, washed with sodium bicarbonate solution, and finally with water. On subsequent distillation 84.5 g. of butyl 2-methyl-2-nitropropyl phthalate, 38 g. of dibutyl phthalate, and 3 g. of 2-methyl-2-nitro-1-propanol were obtained.

The acid phthalates of the aliphatic nitroalcohols are non-volatile white solids, soluble in the common oxygenated organic solvents, slightly soluble in benzol and water, and insoluble in paraffin hydrocarbons. They are suitable for use as new intermediates for the preparation of a wide range of organic compounds.

The mixed phthaltes of the aliphatic nitroalcohols, in general, are liquid at room temperature. Most of the mixed esters are thermally stable up to a temperature of approximately 200° C. above which they ordinarily slowly decompose. In general, they are soluble in common oxygenated organic solvents and aromatic hydrocarbons and insoluble in water. Certain of the mixed phthalates are insoluble in petroleum ether, but others such as butyl 2-methyl-2-nitrobutyl phthalate are soluble therein. In general they are also excellent solvents for nitrocellulose and have been found to be compatible with solutions of ethyl cellulose and various resin compositions. They are considerably less volatile than the neutral phthalates of the lower aliphatic alcohols. For example, the rate of evaporation of normal dibutyl phthalate is approximately five times that of ethyl 2-methyl-2-nitropropyl phthalate, butyl 2-methyl-2-nitrobutyl phthalate and ethyl 2-methyl-2-nitrobutyl phthalate.

The table given below shows the physical properties for additional acid and mixed phthalates of aliphatic nitroalcohols prepared according to the methods outlined in the above examples:

Table

| Compound | B. P. °C. at 5 m. m. corrected | M. P. °C. corrected | Specific gravity 25°/4° | Refractive index 20° C. |
|---|---|---|---|---|
| 2-methyl-2-nitro-propyl hydrogen phthalate | | 121.5 | | |
| 2-methyl-2-nitro-butyl hydrogen phthalate | | { 134 <br> 134.5 } | | |
| Methyl 2-methyl-2-nitropropyl phthalate | 207.5 | 54 | **1.2231 | **1.5135 |
| Ethyl 2-methyl-2-nitropropyl phthalate | 209 | { 23.5 <br> 23.5 } | 1.1916 | **1.5082 |
| Butyl 2-methyl-2-nitropropyl phthalate | { 215 <br> *216 } | | 1.1456 | 1.5034 |
| Methyl 2-methyl-2-nitrobutyl phthalate | 208.5 | | 1.2068 | 1.5128 |
| Ethyl 2-methyl-2-nitrobutyl phthalate | { 208 <br> *209 } | | 1.1733 | 1.5079 |
| Butyl 2-methyl-2-nitrobutyl phthalate | { 219 <br> *220 } | | 1.1357 | 1.5029 |

*With slight decomposition.
**Super-cooled.

Although the above physical properties may be helpful in identifying these compounds, it is to be understood that I do not desire to limit myself to products having the exact physical constants described above, since the data were obtained from single preparations of the various compounds listed.

The aliphatic nitroalcohols used for the preparation of the acid phthalates of the aliphatic nitroalcohols described above may be prepared by any of the previously known methods for preparing aliphatic nitro compounds. However, these compounds may preferably be obtained in accordance with the process of copending application U. S. Ser. No. 146,855 by Byron M. Vanderbilt, filed June 7, 1937. According to this process, a primary or secondary nitroparaffin and an aliphatic aldehyde are reacted in the presence of an auxiliary solvent, such as ethyl alcohol, and in the presence of an alkaline catalyst such as sodium hydroxide, the aldehyde being slowly added to a solution of the nitroparaffin and catalyst in the auxiliary solvent while thoroughly agitating.

My invention now having been described, what I claim is:

1. Esters of phthalic acid of the general formula:

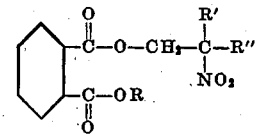

in which R, R', and R'' are members selected from the group consisting of H and alkyl.

2. Aliphatic acid esters of phthalic acid of the general formula:

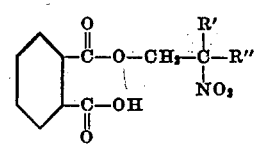

in which R' and R'' are members selected from the group consisting of H and alkyl.

3. 2-methyl-2-nitrobutyl hydrogen phthalate.

4. Mixed esters of phthalic acid of the general formula:

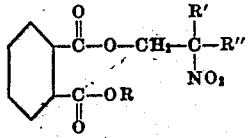

in which R is an alkyl group containing not more than four carbon atoms and R' and R" are members selected from the group consisting of H and alkyl.

5. Ethyl 2-methyl-2-nitrobutyl phthalate.
6. Ethyl 2-methyl-2-nitropropyl phthalate.
7. In a process for the production of acid phthalates of aliphatic nitroalcohols, the step which comprises reacting phthalic anhydride with a molecular excess of an aliphatic nitroalcohol in the presence of an esterification catalyst and at temperatures ranging from 60° C. to not substantially in excess of 100° C.

BYRON M. VANDERBILT.